(12) United States Patent
Romo

(10) Patent No.: US 11,613,371 B1
(45) Date of Patent: Mar. 28, 2023

(54) ELECTRIC VACUUM JET ENGINE

(71) Applicant: John Daniel Romo, New York, NY (US)

(72) Inventor: John Daniel Romo, New York, NY (US)

(*) Notice: Subject to any disclaimer, the term of this patent is extended or adjusted under 35 U.S.C. 154(b) by 0 days.

(21) Appl. No.: 17/703,924

(22) Filed: Mar. 24, 2022

Related U.S. Application Data

(60) Provisional application No. 63/281,557, filed on Nov. 19, 2021.

(51) Int. Cl.
*B64D 27/24* (2006.01)
*B64C 11/00* (2006.01)
*B64C 11/48* (2006.01)

(52) U.S. Cl.
CPC ............ *B64D 27/24* (2013.01); *B64C 11/001* (2013.01); *B64C 11/48* (2013.01)

(58) Field of Classification Search
CPC ....... B64C 11/46; B64C 11/48; B64C 11/001; F04D 19/007; F04D 19/024; B64D 27/24
See application file for complete search history.

(56) References Cited

U.S. PATENT DOCUMENTS

| | | | | |
|---|---|---|---|---|
| 5,551,841 A | * | 9/1996 | Kamada | ................ F04D 29/545 417/89 |
| 8,286,908 B2 | | 10/2012 | Kebrle | |
| 2011/0198440 A1 | | 8/2011 | Saucray | |
| 2020/0017230 A1 | | 1/2020 | Dorfner | |
| 2022/0194557 A1 | * | 6/2022 | Thomas | ............. B64C 29/0025 |

FOREIGN PATENT DOCUMENTS

| | | | | |
|---|---|---|---|---|
| CH | 639728 A | * | 11/1983 | ........... F04D 19/024 |
| EP | 3696388 A1 | * | 8/2020 | ............... F01D 1/26 |
| JP | 2004052563 A | * | 2/2004 | ........... F04D 19/005 |
| RU | 2762920 C1 | * | 12/2021 | |

OTHER PUBLICATIONS

Smith, Dale, Aerodynamic and Aeroacoustic Analysis of Counter Rotating Open Rotors, Jul. 2020.

(Continued)

*Primary Examiner* — Richard A Edgar

(57) ABSTRACT

An electric vacuum jet engine is a more ecofriendly alternative to gas-fueled jet engines that generates the same or higher thrust than traditional gas-fueled jet engines. The jet engine includes a tubular housing, at least one first propeller assembly, and at least one second propeller assembly. The tubular housing accommodates an alternating of series of propeller assemblies formed by the at least one first propeller assembly and the at least one second propeller assembly. Together, the at least one first propeller assembly and the at least one second propeller assembly generate several vacuums along the tubular housing that increase the velocity of air flow through the tubular housing to generate the thrust necessary to propel the desired aircraft. The tubular housing also includes a housing inlet and a housing outlet corresponding to the open ends of the tubular housing through which air flow enters and exits the tubular housing, respectively.

7 Claims, 10 Drawing Sheets

(56) References Cited

OTHER PUBLICATIONS

Prior, Stephen. Reviewing and Investigating the Use of Co-Axial Rotor Systems in Small UAVs. International journal of micro air vehicles. 2010.
Croze, O. (2012). Alternative derivation of the Feigel effect and call for its experimental verification. Proceedings: Mathematical, Physical and Engineering Sciences, 488(2138), 429-447. Retrieved Jun. 27, 2021, from http://www.jstor.org.ccnyproxy1.libr.ccny.cuny.edu/stable/41345883.
Gu, X., Yang, S.; & Tao, L. (1999). Spirals in 2-D Gas Dynamics Systems. Journal of Computational Mathematics, 17(5), 463-474. Retrieved Jul. 4, 2021, from http://www.jstor.org.ccny-proxy1.libr.ccny.cuny.edu/stable/43692804.
Hollands, E.O. and He, C. and Gan, L. 'A particle image velocimetry study of dual-rotor counter-rotating wind turbine near wake.', Journal of visualization., 23 (3). pp. 425-435., 2020.
Lesicutre, Daniel J. and John P. Sullivan. "The Analysis of Counter Rotation Propeller Systems." SAE Transactions vol. 94, Section 4 (1995) pp. 561-575. Middleton, W. 1969.
Ohta, Y., Ohkubo, S., Lino, K., Nagaoka, M., Nagano, K., & Katagiri, N. (2004), Study of Coaxial Counter Rotating Rotary Tilling System at Front Rotary Type Compact Walking Tractor. SAE Transactions; 113, 651-657. Retrieved Jul. 4, 2021, from http://www.jstor.org.ccny-proxy1.libr.ccny.cuny.edu/stable/44718862.
Rebah, D. (2006). A Steady Vortex Ring in Poiseuille Flow and Rearrangements of a Function. Proceedings: Mathematical, Physical and Engineering Sciences, 462(2068), 1235-1253. Retrieved Jun. 27, 2021, from http://www.jstor.org.ccnyproxy1.libr.ccny.cuny.edu/stable/20208938.
Stanton, Tom. Counter Rotation Demonstrations. University of Hertfordshire, 2011 <URL: https://www.youtube.com/watch?v=oMFUWVjl_DQ>.
Tinney, Charles E. Experiments, U.T. Austin, Texas, 2019. Thrust and Acoustic Performance of Small-Scale, Coaxial, Corotating Rotors in Hover. AIAA Journal 58(4):1-11. 10.2514/1.J058489.
Webster, C. (1965). The Discovery of Boyle's Law, and the Concept of the Elasticity of Air in the Seventeenth Century. <i>Archive for History of Exact Sciences,</i> <i>2</i>(6). 441-502. Retrieved Sep. 3, 2021, from http://www.jstor.org/stable/41133249.

* cited by examiner

ELECTRIC VACUUM JET ENGINE

FIELD OF THE INVENTION

The present invention relates generally to aircraft and propulsion systems. More specifically, the present invention provides a novel jet engine that is electrically powered and utilizes a series of propellers to generate higher thrust.

BACKGROUND OF THE INVENTION

Nowadays, most gas-fueled jet engines weigh an average of 20,000 pounds (lbs). The weight of these jet engines not only limit the efficiency of most aircraft, but also increase the fuel consumption required for the aircraft to travel. This leads to huge amounts of fuel consumption and also to greater pollution due to the all the fuel consumed to propel the aircraft. There are alternatives to gas-fueled engines that help alleviate the downsides of gas-fueled engines. For example, electrical jet engines are more eco-friendly alternatives that do not run on traditional fuel and produce less pollution. However, many of the current alternate engines do not meet the same efficiency as traditional gas-fueled jet engines. Even jet engines that use eco-friendly fuel fail to meet the same specifications as traditional gas-fueled jet engines. Therefore, there is a need for an improved eco-friendly jet engine that may overcome the deficiencies of current non-gas-fueled jet engines.

An objective of the present invention is to provide an electric vacuum jet engine that is able to generate the same or higher thrust than traditional gas-fueled jet engines. Another objective of the present invention is to provide an electric vacuum jet engine that can generate thrust by generating a pressure differential using one or more vacuums within the jet engine to exhaust air flow from the jet engine at a high velocity. Another objective of the present invention is to provide an electric vacuum jet engine that is energy efficient and ecofriendly. Additional features and benefits of the present invention are further discussed in the sections below.

SUMMARY OF THE INVENTION

The present invention is an electric vacuum jet engine that that reduces the downsides of traditional gas-fueled jet engines. The electric vacuum jet engine consists of a series of iterations or decks formed by sets of counter-rotating propeller assemblies barely separated by the width of ball bearings or gears. These series of propeller assemblies are rotatably mounted within a tubular housing so that air flow guided into the tubular housing is exhausted by the series of propeller assemblies to generate thrust. For example, air flow would enter the housing inlet at the top and progress down through the series of propeller assemblies until the air flow exits through the housing outlet. During the process described, the air flow velocity would increase at the rate of five times at each iteration, as shown below:

$$\sum \frac{m^3}{\sec} = 5^6 = 78{,}125 \ \frac{m^3}{\sec}$$

$$78{,}125 \ \frac{m^3}{\sec} / 1714 = 46 \ \text{horsepower(hp)}$$

$$\sum \frac{m^3}{\sec} = 5^7 = 390{,}625 \ \frac{m^3}{\sec}$$

-continued $$390{,}625 \ \frac{m^3}{\sec} / 1714 = 228 \ \text{hp}$$

$$228 \ \text{hp} / 46 \ \text{hp} \cong 5 \ \text{magnitude increase}$$

The air flow velocity increase is caused by the instantaneous filling of the air to the vacuum developed by the counter-rotation of the counter-rotating propeller blades in between each iteration. Specific experiments in this field are not many. Theoretically, the vacuum force can become evident at the moment that air is extracted out of a sealed bottle by a pneumatic mechanism. When a pump, for instance, extracts air out of the bottle, the extraction results in a vacuum. The vacuum, then, can be considered as a force contained within by the walls of its container. This force is not only measurable but is also effective time wise for as long as the air is out of the container. For example, one of the various experiments conducted by Tom Stanton at the University of Hertfordshire on counter rotating propellers, conducted during 2018, experimented on a counter-rotating propeller arrangement where two propellers faces against each other. Although at this time there is no data to show how fast the air can fill up the vacuum resulting from the counter rotating propellers, Stanton's experiments show that an air vector consisting of force and direction during the first second produce 2.87 cubic meters per second of air flow. The air flow of 2.87 cubic meters flows while only one of the propellers is rotating. Then, when the counter propeller starts rotating, the flow increases to 14.35 cubic meters per second, which is about five times the initial flow.

DETAIL DESCRIPTIONS OF THE INVENTION

Figure 1:
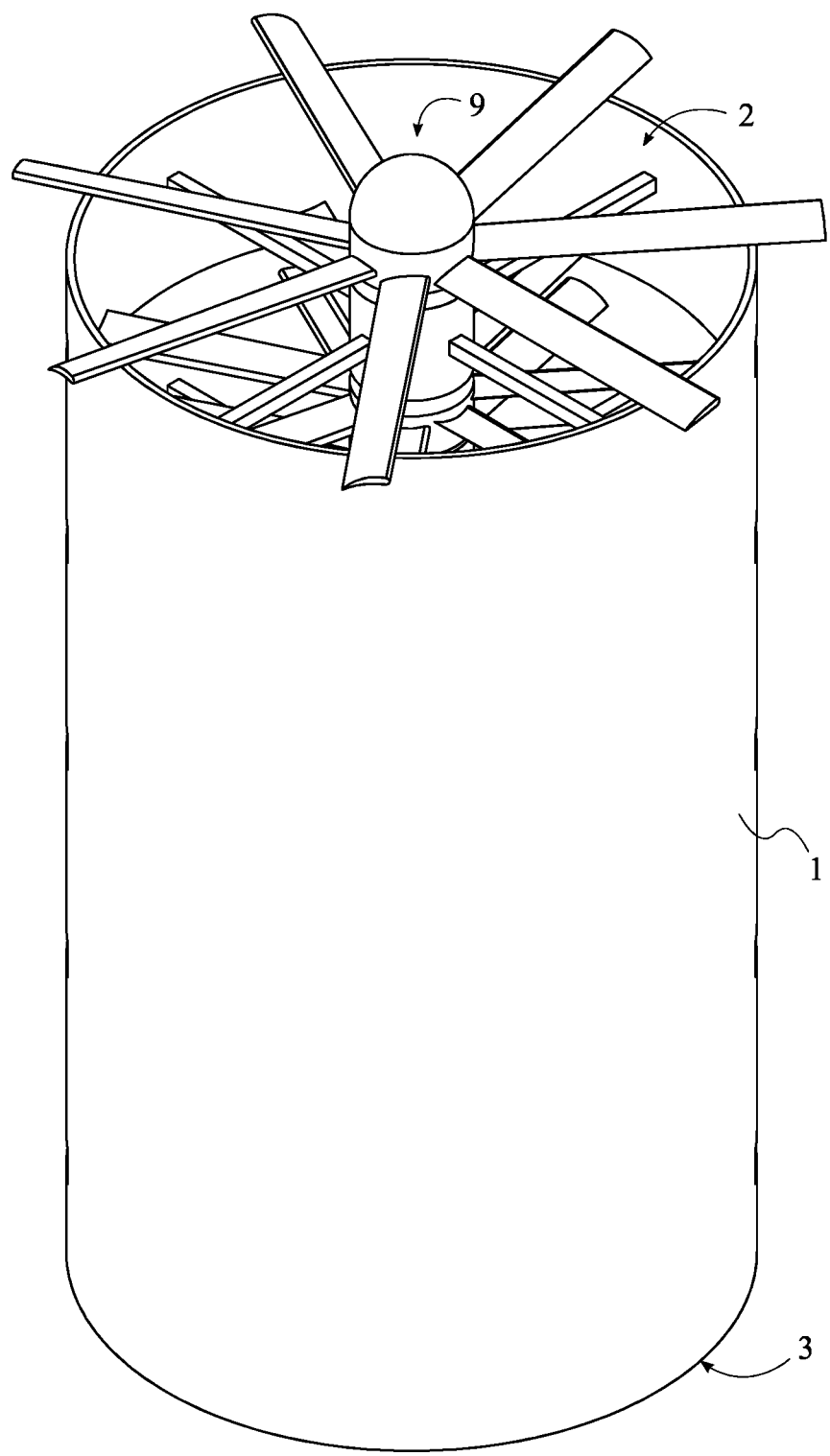
FIG. 1 is a top front perspective view of the present invention.
Figure 2:
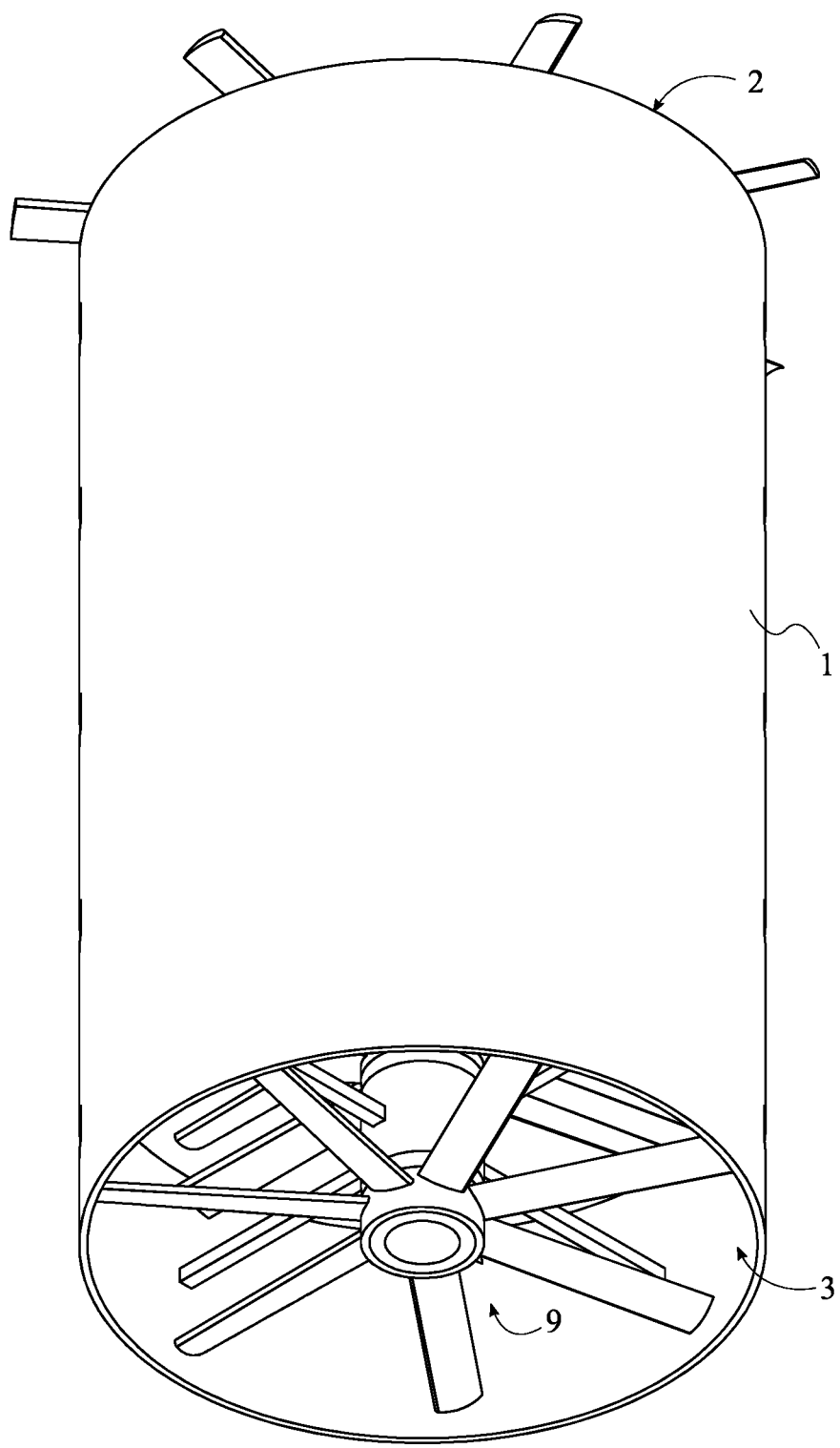
FIG. 2 is a bottom rear perspective view of the present invention.
Figure 3:
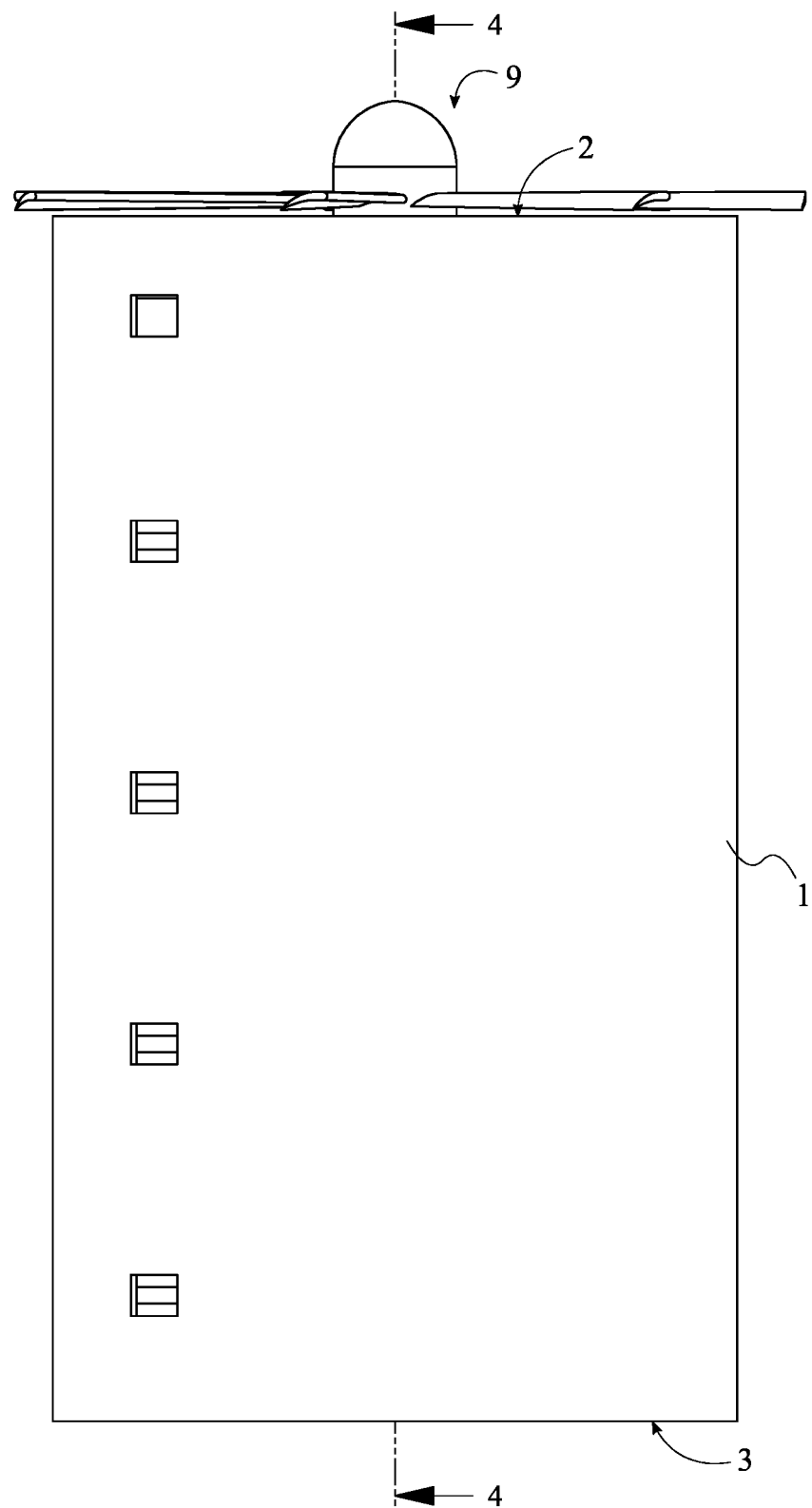
FIG. 3 is a front view of the present invention.
Figure 4:
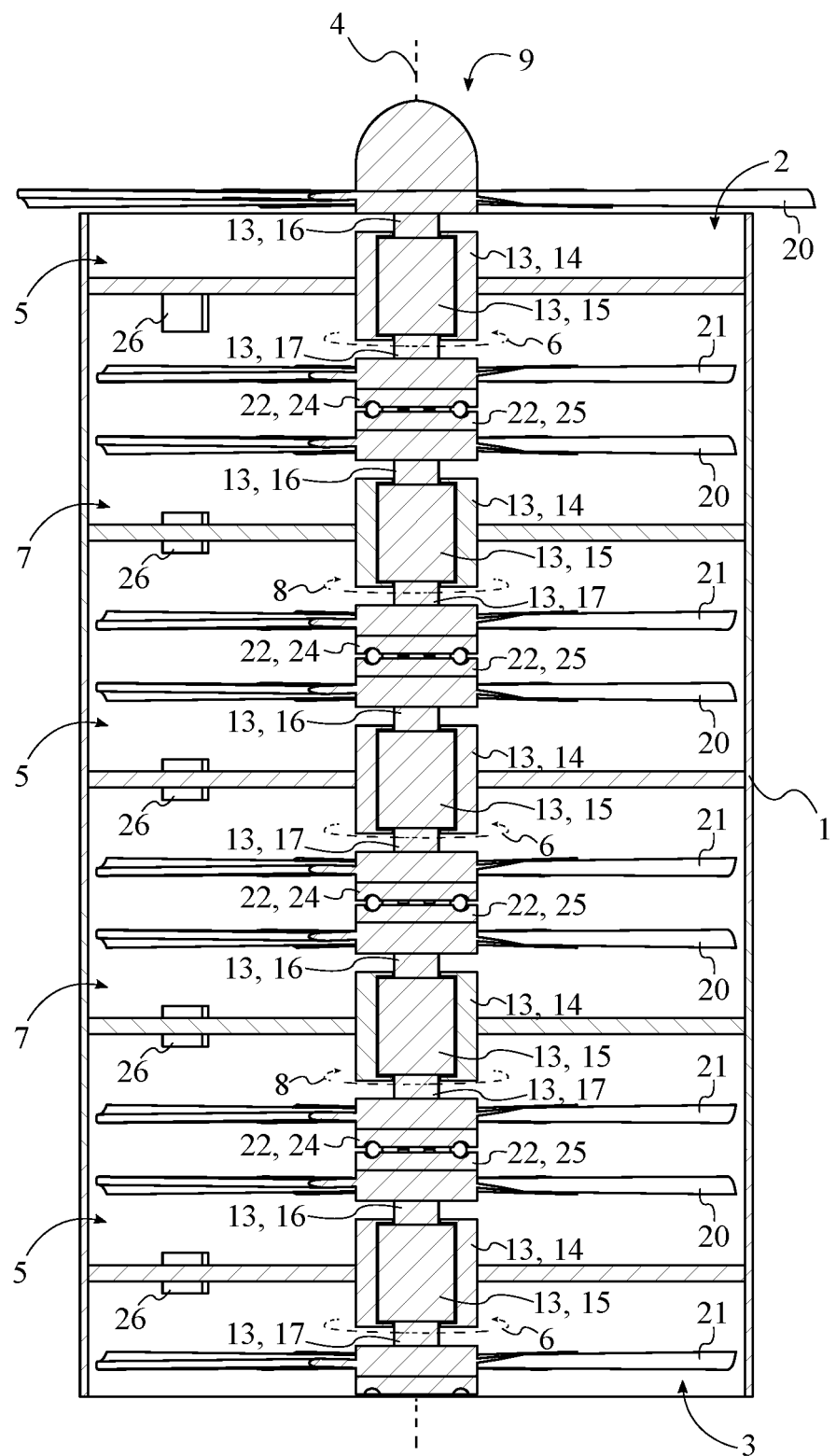
FIG. 4 is a vertical cross-sectional view taken along line 4-4 in FIG. 3.
Figure 5:
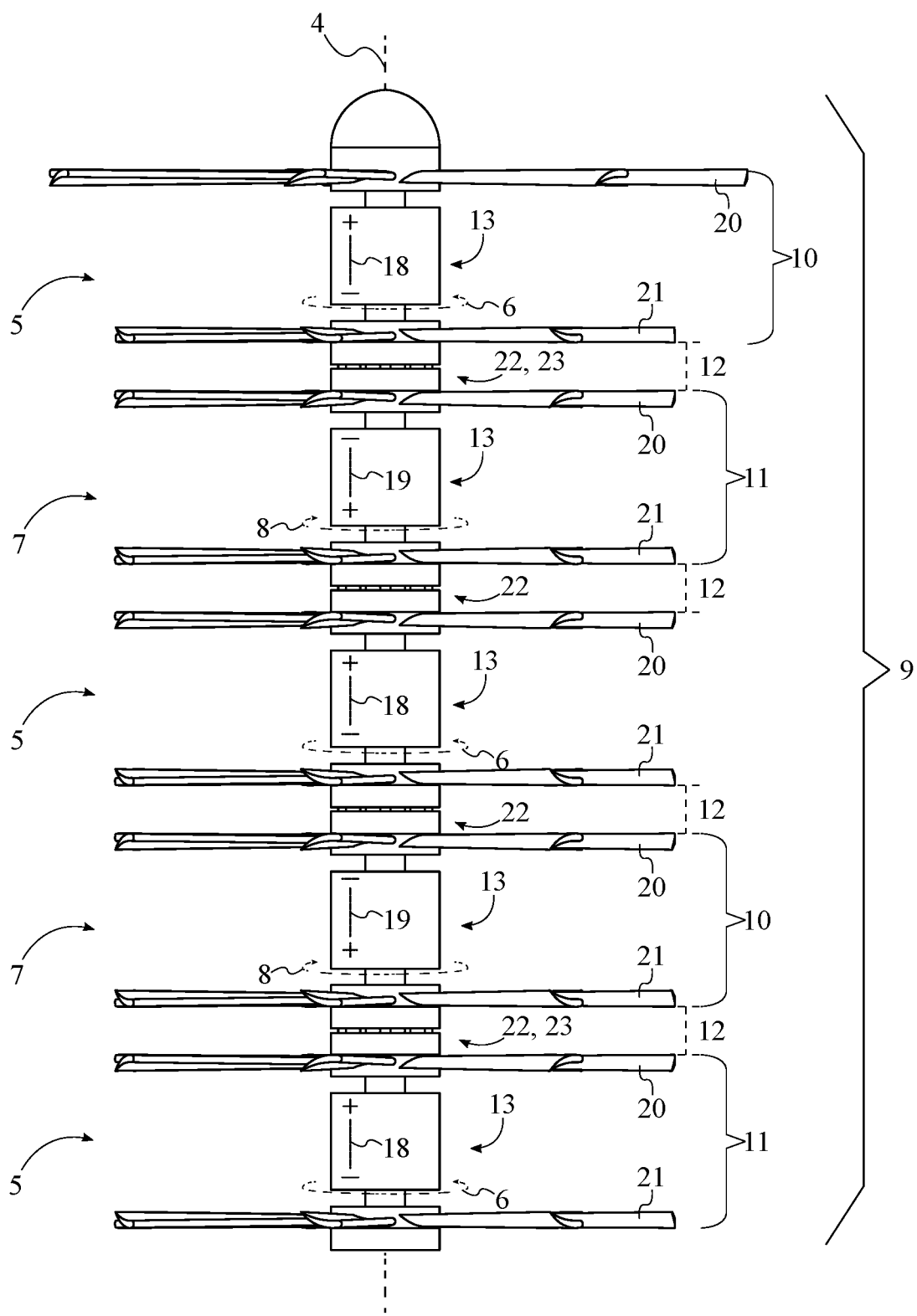
FIG. 5 is a front view of the alternating series of propeller assemblies of the present invention.
Figure 6:
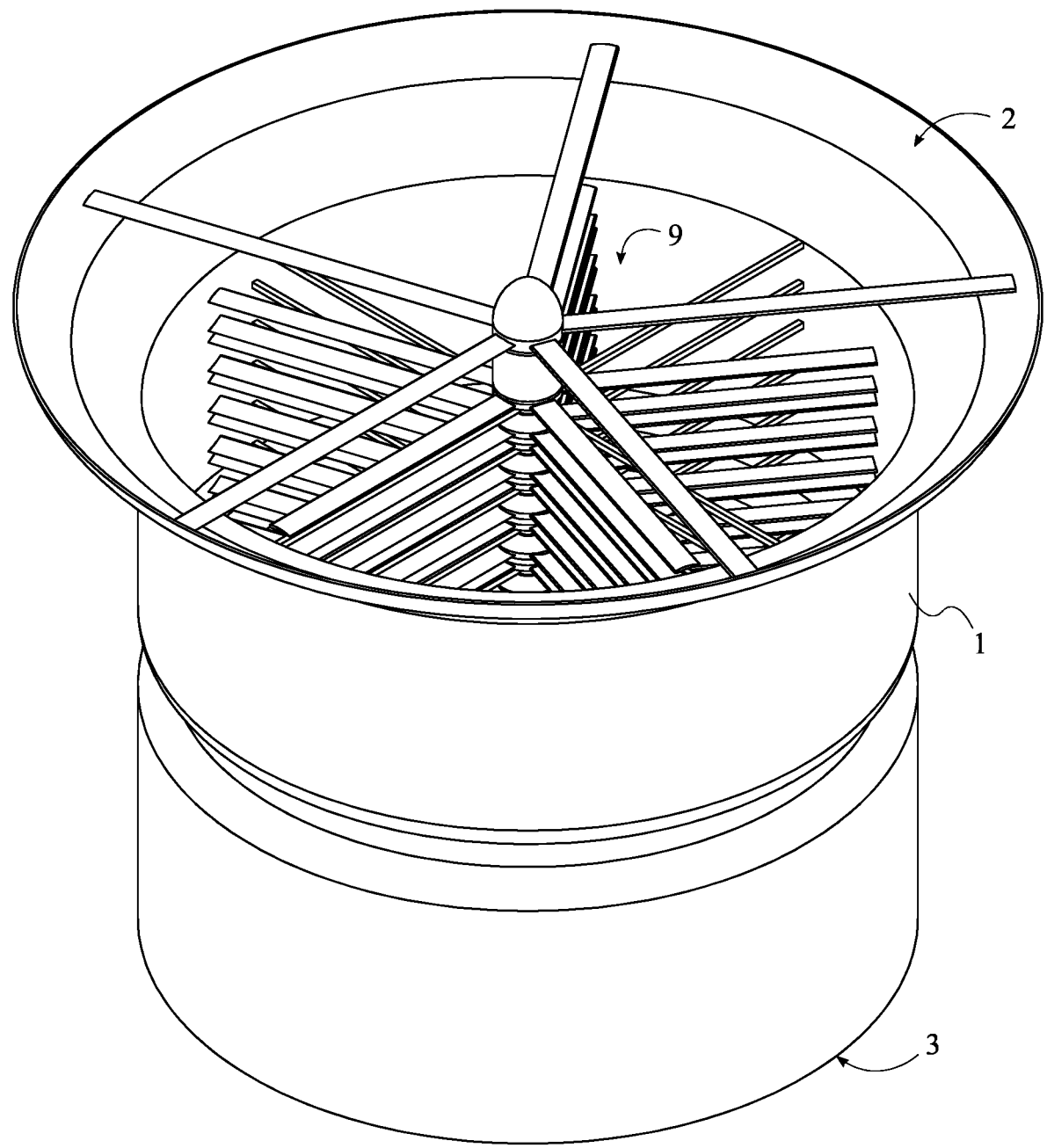
FIG. 6 is a top front perspective view of an alternative embodiment of the present invention.
Figure 7:
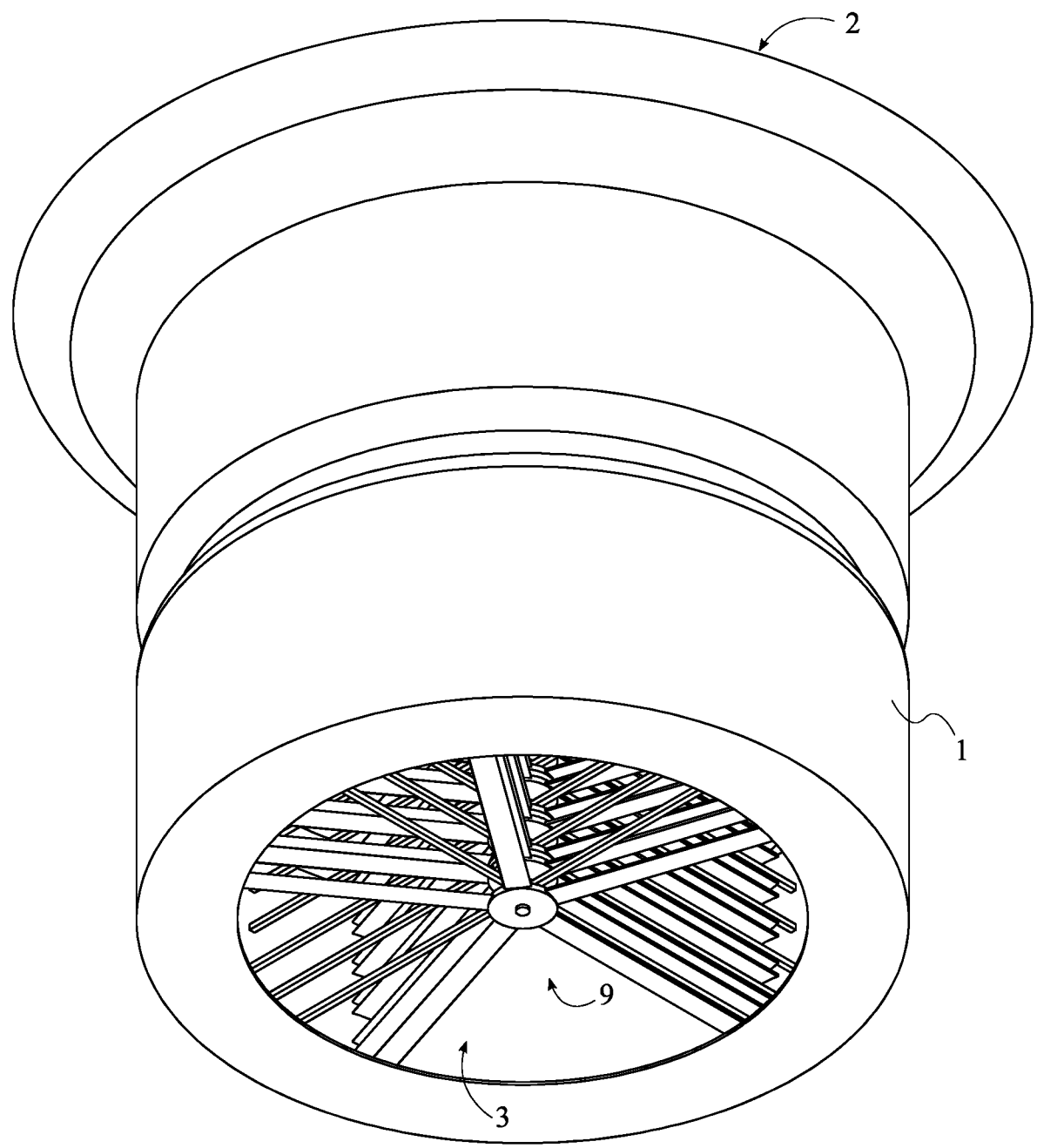
FIG. 7 is a bottom rear perspective view of the alternative embodiment of the present invention.
Figure 8:
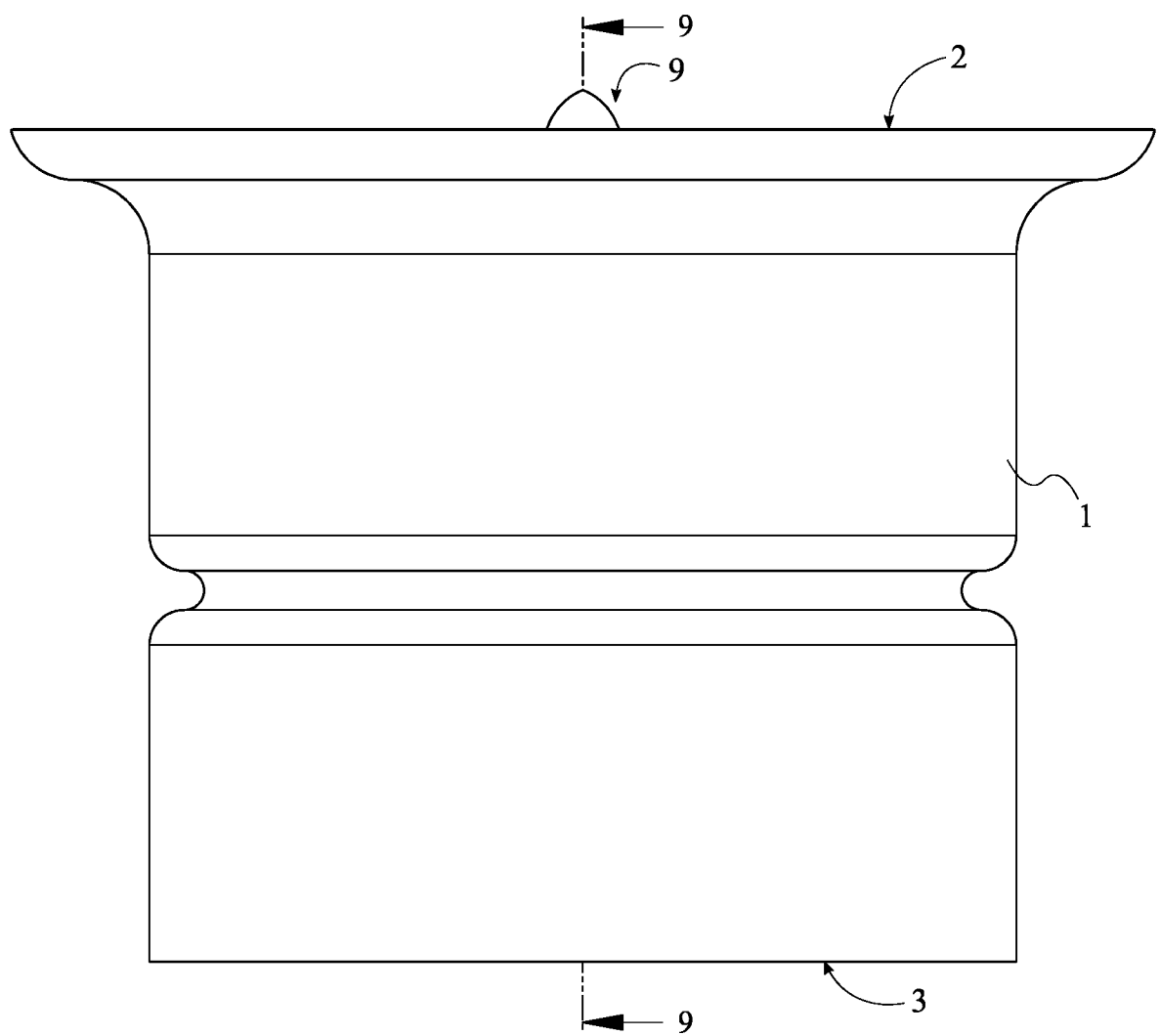
FIG. 8 is a front view of the alternative embodiment of the present invention.

All illustrations of the drawings are for the purpose of describing selected versions of the present invention and are not intended to limit the scope of the present invention.

The present invention is an electric vacuum jet engine that serves as a more ecofriendly alternative to gas-fueled jet engines that is able to generate the same or more thrust than traditional gas-fueled jet engines. As can be seen in FIG. 1 through 5, the present invention may comprise a tubular housing 1, at least one first propeller assembly 5, and at least one second propeller assembly 7. The tubular housing 1 is designed to accommodate an alternating series of propeller assemblies 9 formed by the at least one first propeller assembly 5 and the at least one second propeller assembly 7. Together, the at least one first propeller assembly 5 and the at least one second propeller assembly 7 create several vacuums along the tubular housing 1 to increase the velocity of air flow through the tubular housing 1 to generate the thrust necessary to propel the desired aircraft.

The general arrangement of the aforementioned components enables an electrically powered jet engine to generate sufficient thrust for the desired aircraft while lowering the load on the aircraft and lowering the environmental impact of the jet engine. As can be seen in FIG. 1 through 5, the tubular housing 1 is an elongated tubular structure long enough to house the desired number of iterations of alternating propeller assemblies. In addition, the tubular housing 1 comprises a housing inlet 2 and a housing outlet 3 corresponding to the open ends of the tubular housing 1 through which air flow enters and exits the tubular housing 1, respectively. Due to the elongated structure of the tubular housing 1, the housing inlet 2 and the housing outlet 3 are positioned opposite to each other along the tubular housing 1. Further, the at least one first propeller assembly 5 and the at least one second propeller assembly 7 are arranged into an alternating series of propeller assemblies 9 in order to position a first propeller assembly against a second propeller assembly. Each from the series of propeller assemblies are also rotatably mounted within the tubular housing 1 about a central housing axis 4 of the tubular housing 1 so that the corresponding propellers are able to freely rotate within the tubular housing 1 in the corresponding directions.

In order to generate several vacuums within the tubular housing 1, the at least one first propeller assembly 5 is configured to rotate in a first angular direction 6 while the at least one second propeller assembly 7 is configured to rotate in a second angular direction 8. As can be seen in FIG. 1 through 5, in addition, the first angular direction 6 and the second angular direction 8 are oriented opposite to each other. The rotation of the first propeller assembly against the counter rotation of the second propeller assembly help create a vacuum between the first propeller assembly and the second propeller assembly. Furthermore, an arbitrary propeller assembly 10 is positioned offset from an adjacent propeller assembly 11 by a corresponding separation distance 12. The corresponding separation distance 12 is a short distance between the arbitrary propeller assembly 10 and the adjacent propeller assembly 11 that facilitates the generation of the vacuum where air flow is moved into by the arbitrary propeller assembly 10 and then exhausted by the adjacent propeller assembly 11. The vacuums formed are distributed along as the arbitrary propeller assembly 10 is any assembly from the alternating series of propeller assemblies 9, and the adjacent propeller assembly 11 is also from the alternating series of propeller assemblies 9. Thus, the alternating series of propeller assemblies 9 includes a number of first propeller assemblies and a number of second propeller assemblies according to the thrust requirements of the desired aircraft.

In order to ensure the counter rotation between the at least one first propeller assembly 5 and the at least one second propeller assembly 7, each from the alternating series of propeller assemblies 9 comprising a motor 13, a forward propeller 20, and a rearward propeller 21. As can be seen in FIG. 1 through 5, the motor 13 ensures that each propeller assembly from the alternating series of propeller assemblies 9 can rotate independently in the necessary angular direction. To do so, the motor 13 comprises a stator 14, a rotor 15, a forward axle 16, and a rearward axle 17. The stator 14 is mounted within the tubular housing 1 to enable the free rotation of the rotor 15. So, the rotor 15 is rotatably mounted to the stator 14. The forward axle 16 and the rearward axle 17 are positioned opposite to each other about the rotor 15. In addition, the forward axle 16 and the rearward axle 17 are positioned collinear to the central housing axis 4. This arrangement enables that both the forward axle 16 and the rearward axle 17 can rotate in the same direction but are separated from each other. Further, the forward propeller 20 is torsionally connected to the rotor 15 by the forward axle 16 so that the forward propeller 20 is rotated by the rotor 15. Likewise, the rearward propeller 21 is torsionally connected to the rotor 15 by the rearward axle 17 so that the rearward propeller 21 is also rotated by the rotor 15. Thus, both the forward propeller 20 and the rearward propeller 21 are rotated simultaneously in the direction of the rotation of the rotor 15.

As can be seen in FIG. 1 through 5, to ensure that every two adjacent propeller assemblies from the alternating series of propeller assemblies 9 rotate counter to each other to increase the thrust generated, if the adjacent propeller assembly 11 succeeds the arbitrary propeller assembly 10 in the alternating series of propeller assemblies 9, then the rearward propeller 21 of the arbitrary propeller assembly 10 is positioned offset from the forward propeller 20 of the adjacent propeller assembly 11 by the corresponding separation distance 12. Otherwise, if the adjacent propeller assembly 11 precedes the arbitrary propeller assembly 10 in the alternating series of propeller assemblies 9, then the forward propeller 20 of the arbitrary propeller assembly 10 is positioned offset from the rearward propeller 21 of the adjacent propeller assembly 11 by the corresponding separation distance 12. This way, there is a vacuum generated in between every two adjacent propeller assemblies from the alternating series of propeller assemblies 9. Further, the motor 13 for the at least one first propeller assembly 5 is configured to conduct a first electrical polarity 18, while the motor 13 for the at least one second propeller assembly 7 is configured to conduct a second electrical polarity 19. The first electrical polarity 18 and the second electrical polarity 19 are preferably opposite to each other. Thus, every two adjacent propeller assemblies from the alternating series of propeller assemblies 9 rotate counter each other. So, as air flow is moved by the arbitrary propeller assembly 10 towards the vacuum in the corresponding separation distance 12, the air flow quickly fills the vacuum and is then immediately moved out of the vacuum by the adjacent propeller assembly 11. The process is repeated as necessary to generate the desired thrust to propel the aircraft.

In order to create and maintain the corresponding separation distance 12, the present invention may further comprise a plurality of annular bearings 22. As can be seen in FIG. 1 through 5, the plurality of annular bearings 22 keep every two adjacent propeller assemblies from the alternating series of propeller assemblies 9 separate from each other while also enabling rotational independence from each other. To do so, each of the plurality of annular bearings 22 is mounted within the tubular housing 1 about the central housing axis 4 to keep everything axially aligned inside the tubular housing 1. The arbitrary propeller assembly 10 is operatively coupled to the adjacent propeller assembly 11 by a corresponding annular bearing 23 from the plurality of annular bearings 22. This way, an annular bearing is positioned in between two adjacent propeller assemblies. The corresponding annular bearing 23 maintains a rotational independence between the arbitrary propeller assembly 10 and the adjacent propeller assembly 11. In addition, the corresponding separation distance 12 is spanned by the corresponding annular bearing 23. In other words, the width of the corresponding annular bearing 23 is preferably equal to the corresponding separation distance 12. However, in other embodiments, the corresponding separation may be larger than the width of the corresponding annular bearing 23.

As can be seen in FIG. 1 through 5, in one embodiment, the corresponding annular bearing 23 comprises a forward race 24 and a rearward race 25 that are separately mounted onto adjacent propellers. In addition, the forward race 24 and the rearward race 25 are rotatably connected to each other to form a single structure that does not interfere with the rotation of the adjacent propellers. As the corresponding annular bearing 23 spans the corresponding separation distance 12, the forward race 24 and the rearward race 25 are positioned opposite to each other along the corresponding separation distance 12. If the adjacent propeller assembly 11 succeeds the arbitrary propeller assembly 10 in the series of propeller assemblies 9, then a rearward propeller 21 of the arbitrary propeller assembly 10 is torsionally connected to the forward race 24, while a forward propeller 20 of the adjacent propeller assembly 11 is torsionally connected to the rearward race 25. Alternatively, if the adjacent propeller assembly 11 precedes the arbitrary propeller assembly 10 in the series of propeller assemblies 9, then a rearward propeller 21 of the adjacent propeller assembly 11 is torsionally connected to the forward race 24, while a forward propeller 20 of the arbitrary propeller assembly 10 is torsionally connected to the rearward race 25. This ensures that every two adjacent propeller assemblies from the alternating series of propeller assemblies 9 are separated by an annular bearing. Thus, the two adjacent propeller assemblies can rotate counter to each other without risk of collision while maintaining a short separation distance between the propellers to form the appropriate vacuum. In other embodiments, the plurality of annular bearings 22 can be replaced with other rotational mechanisms, such as a gear system that is also able to maintain the necessary separation distance between adjacent propeller assemblies.

When starting the present invention, air flow may not quickly reach all the propeller assemblies within the tubular housing 1 for a safe start. So, the present invention may further comprise a plurality of air vents 26. As can be seen in FIG. 1 through 5, the plurality of air vents 26 is designed to enable air flow directly into the individual propeller assemblies that may far from the housing inlet 2. To do so, the plurality of air vents 26 is distributed along the tubular housing 1. The plurality of air vents 26 is preferably arranged so that enough air flow is guided into the propeller assemblies furthest from the housing inlet 2 until normal air flow is achieved. The plurality of air vents 26 is also laterally integrated into the tubular housing 1 so that air can flow through the tubular housing 1. The plurality of air vents 26 may include mechanical means to seal the air vents after the safe start but depending on the design of the tubular housing 1, the plurality of air vents 26 may be kept open throughout the operation of the present invention.

As can be seen in FIG. 6 through 10, in an alternate embodiment, the at least one first propeller assembly 5 may be a plurality of first propeller assemblies 27 and the at least one second propeller assembly 7 may be a plurality of second propeller assemblies 28. In this alternate embodiment, the plurality of first propeller assemblies 27 and the plurality of second propeller assemblies 28 are still arranged into an alternating series of propeller assemblies 9 within the tubular housing 1. However, a first motor 29 is positioned terminal and connected to the plurality of first propeller assemblies 27, while a second motor 30 is positioned terminal and connected to the plurality of second propeller assemblies 28. This way, the first motor 29 drives the plurality of first propeller assemblies 27, while the second motor 30 drives the plurality of second propeller assemblies 28. This arrangement is designed to drastically reduce the loss of air pressure vital for the transfer of power from iteration to iteration (Boyle's Law and Charles' Law of ideal gas). Both the first motor 29 and the second motor 30 conduct opposite electrical polarities so that the first motor 29 rotates the plurality of first propeller assemblies 27 in one angular direction while the second motor 30 rotates the plurality of second propeller assemblies 28 in an opposite angular direction. Furthermore, the first motor 29 is torsionally connected to the plurality of first propeller assemblies 27 by a first gear system 31, while the second motor 30 is torsionally connected to the plurality of second propeller assemblies 28 by a second gear system 32.

Figure 9:
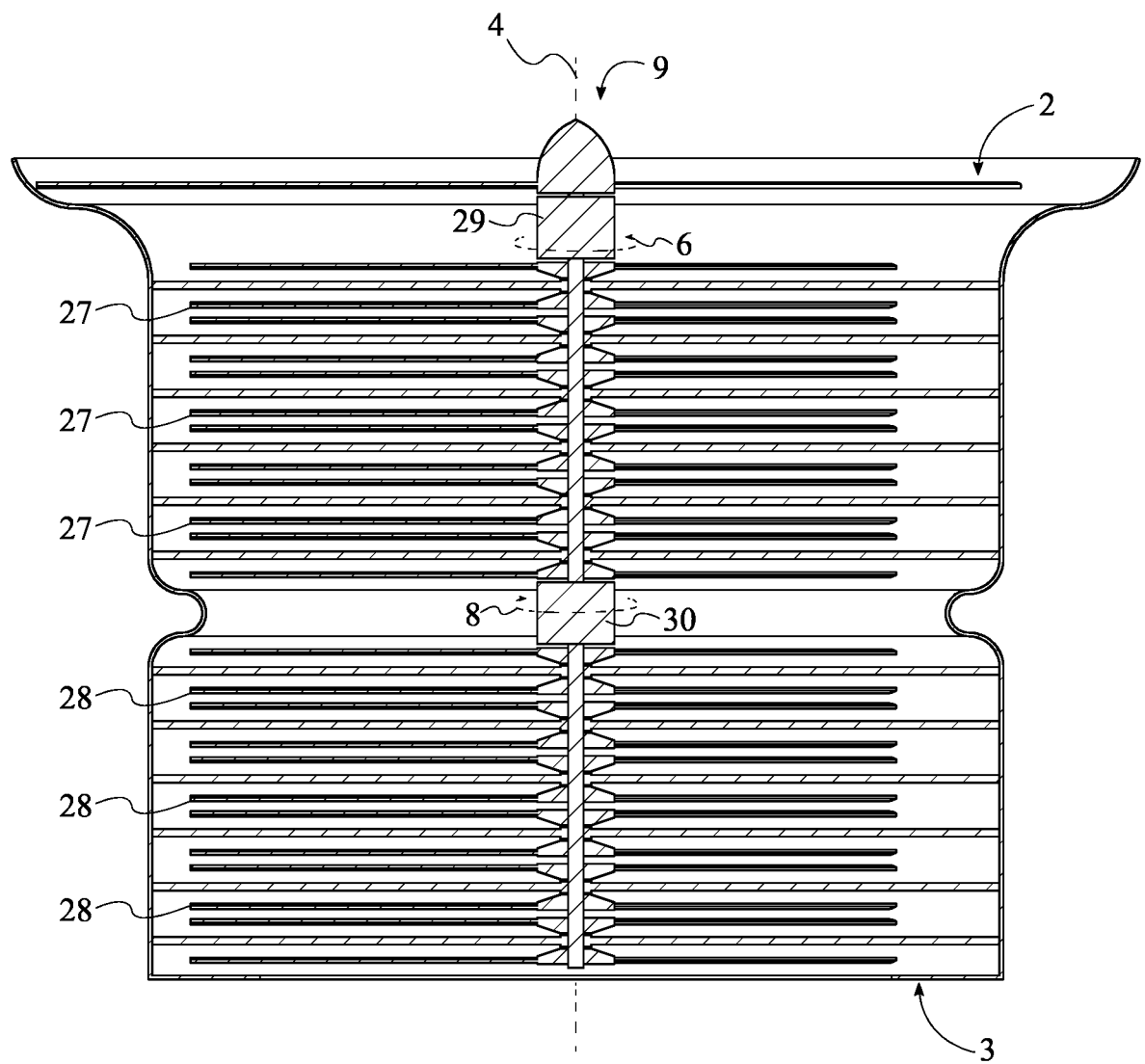
FIG. 9 is a vertical cross-sectional view taken along line 9-9 in FIG. 8.
Figure 10:
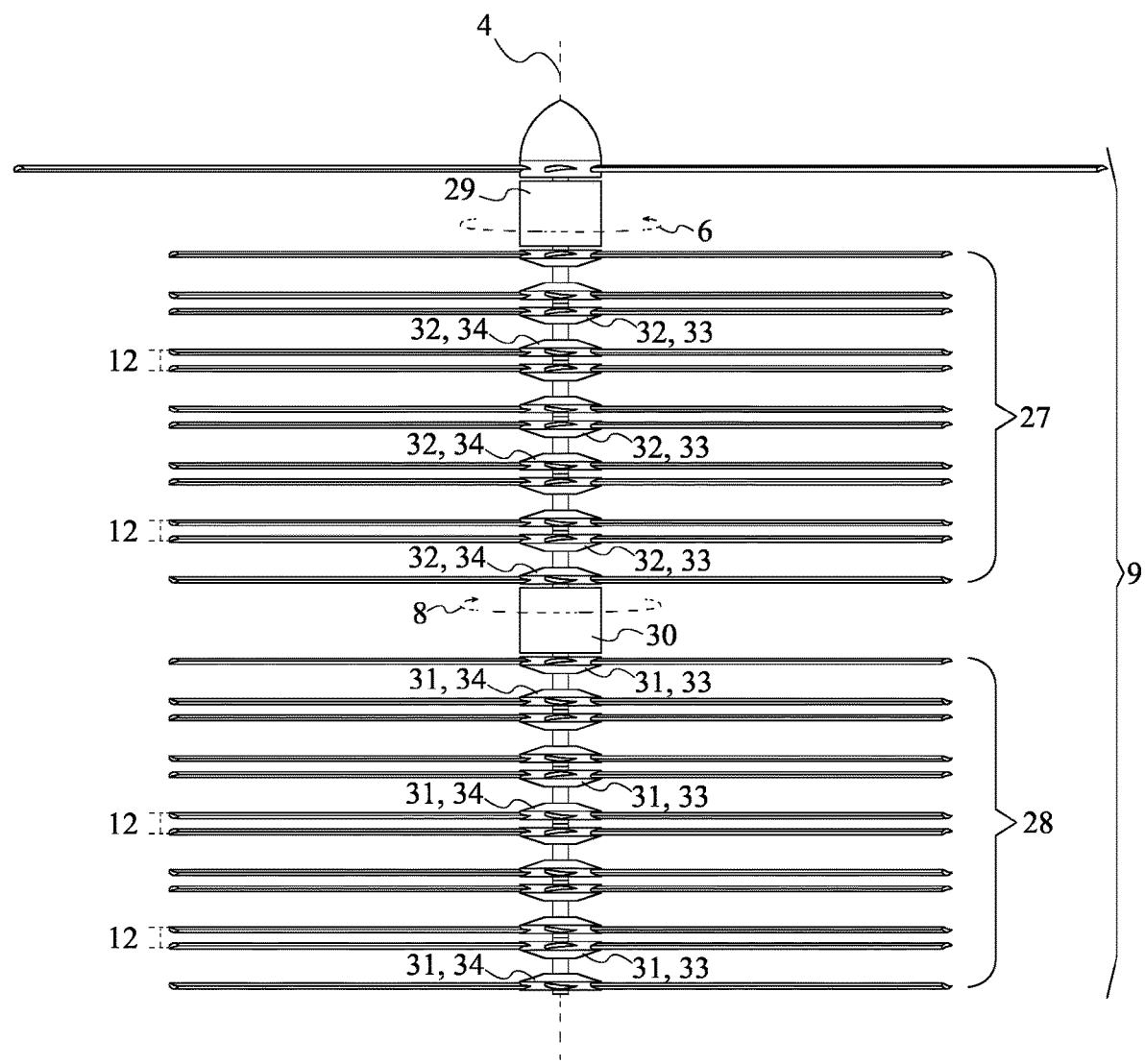
FIG. 10 is a front view of the alternating series of propeller assemblies of the alternative embodiment of the present invention.

As can be seen in FIGS. 9 and 10, the first gear system 31 and the second gear system 32 replace the plurality of annular bearings 22 to maintain the corresponding separation distance 12 between the propellers while also transferring the torque from the corresponding motor to the corresponding propellers. Like the plurality of annular bearings 32, the first gear system 31 and the second gear system 32 may each comprise a plurality of first gear plates 33 and a plurality of second gear plates 34 that connect the propeller assemblies to the corresponding gear system. In this embodiment, each of the first propellers of the plurality of first propeller assemblies 27 is separated by a separation distance from the adjacent first propeller by the first gear system 31. Similarly, each of the second propellers of the plurality of second propeller assemblies 28 is separated by a separation distance from the adjacent second propeller by the second gear system 32. This way, this embodiment is able to generate the required thrust necessary to propel the desired aircraft while maintain the corresponding separation distance 12 between the adjacent set of propellers.

Exemplary Embodiment of the Present Invention

In an exemplary embodiment, the tubular housing 1 is configured to hold six iterations of the alternating series of propeller assemblies 9. The six iterations are set as counter-rotating pairs and positioned vertically one on top of the other so that the air flow vector increases five times at each iteration. Once the counter-rotating propellers are running, the corresponding separation distance 12 becomes a vacuum. The vacuum gets instantly filled back with air by the atmospheric pressure, which varies with relation to sea level. The closer the present invention runs at sea level, the higher the thrust. To ensure proper function, the propeller assemblies adjacent to the housing outlet 3 are recommended to be started first. Air flow from the plurality of vents helps expedite the process while also increasing the thrust being generated.

The exemplary embodiment involves two basic factors: air elasticity and the corresponding separation distance 12. Starting with the air flexibility, one can use the following formula:

$$Cv = q[SG(T+460)]^{1/2}/(F_L 834)pi$$

Where is the flow coefficient, q is air flow rate, SG is specific gravity relative to air at standard pressure and temperature [14.7 pounds per square inch absolute (psia) and 60 degrees Fahrenheit (F)], T is the flowing air temperature, $F_L$ is the pressure recovery factor, and $p_t$ is the inlet absolute pressure. The resulting numbers of these calculations and estimates provide applications for different types of aircraft. For instance, four 46-hp jet engines may be installed in small aircrafts that carry two people, and two 228-hp jet engines may be installed in small passenger aircrafts such as a Cessna, a Beechcraft, or a Piper, all of which could carry up to six passengers.

The present invention may be meant mostly for vehicles that fly at a low altitude, such as emergency transportation air vehicles to hospitals and medical centers, commutes from home to work and back, various errands, doctor visits, marketing, etc., that may be within a 20-to-30-mile range, seldom flying any higher than 10,000-20,000 feet (ft) altitude. The power of the power of the present invention is sufficient to carry two people with a top weight of 350 lbs. Other limitations may be based on design specifications for air vehicles such as postal carriers, delivery, and pick-ups, etc. Further, the aircraft described here is thought to require four motors of about 50 hp. This installation brings the weight of the vehicle to a higher amount. Since each motor weighs 200 pounds (lbs), that may bring the total to 800 lbs. To avoid this extra load, an increase of the thrust generated by the present invention can help overcome the additional load. An engine this powerful may still weigh about 200 lbs, but may allow the installation on the vehicle to save 600 lbs.

Although the invention has been explained in relation to its preferred embodiment, it is to be understood that many other possible modifications and variations can be made without departing from the spirit and scope of the invention.

What is claimed is:

1. An electric vacuum jet engine comprising:
   a tubular housing;
   at least one first propeller assembly;
   at least one second propeller assembly;
   a plurality of annular bearings;
   a plurality of air vents;
   the tubular housing comprising a housing inlet and a housing outlet;
   the housing inlet and the housing outlet being positioned opposite to each other along the tubular housing;
   the at least one first propeller assembly and the at least one second propeller assembly being arranged into an alternating series of propeller assemblies;
   each from the alternating series of propeller assemblies being rotatably mounted within the tubular housing about a central housing axis of the tubular housing;
   the at least one first propeller assembly being configured to rotate in a first angular direction;
   the at least one second propeller assembly being configured to rotate in a second angular direction;
   the first angular direction and the second angular direction being oriented opposite to each other;
   an arbitrary propeller assembly being positioned offset from an adjacent propeller assembly by a corresponding separation distance, wherein the arbitrary propeller assembly is any assembly from the alternating series of propeller assemblies, and wherein the adjacent propeller assembly is from the alternating series of propeller assemblies, and wherein the adjacent propeller assembly succeeds or precedes the arbitrary propeller assembly in the alternating series of propeller assemblies;
   the corresponding separation distance being configured to generate a vacuum between the arbitrary propeller assembly and the adjacent propeller assembly as fluid flow occurs between the arbitrary propeller assembly and the adjacent propeller assembly;
   each of the plurality of annular bearings being mounted within the tubular housing about the central housing axis;
   the arbitrary propeller assembly being operatively coupled to the adjacent propeller assembly by a corresponding annular bearing from the plurality of annular bearings, wherein the corresponding annular bearing is used to maintain a rotational independence between the arbitrary propeller assembly and the adjacent propeller assembly;
   the corresponding separation distance being spanned by the corresponding annular bearing;
   the plurality of air vents being distributed along the tubular housing;
   the plurality of air vents being laterally integrated into the tubular housing;
   each of the plurality of air vents being positioned adjacent to a corresponding propeller assembly from the alternating series of propeller assemblies; and
   each of the plurality of air vents being configured to be selectively opened or closed by a mechanical seal.

2. The electric vacuum jet engine as claimed in claim 1 comprising:
   each from the alternating series of propeller assemblies comprising a motor, a forward propeller, and a rearward propeller;
   the motor comprising a stator, a rotor, a forward axle, and a rearward axle;
   the stator being mounted within the tubular housing;
   the rotor being rotatably mounted to the stator;
   the forward axle and the rearward axle being positioned opposite to each other about the rotor;
   the forward axle and the rearward axle being positioned collinear to the central housing axis;
   the forward propeller being torsionally connected to the rotor by the forward axle; and
   the rearward propeller being torsionally connected to the rotor by the rearward axle.

3. The electric vacuum jet engine as claimed in claim 2 comprising:
   the adjacent propeller assembly succeeding the arbitrary propeller assembly in the alternating series of propeller assemblies; and
   the rearward propeller of the arbitrary propeller assembly being positioned offset from the forward propeller of the adjacent propeller assembly by the corresponding separation distance.

4. The electric vacuum jet engine as claimed in claim 2 comprising:
   the adjacent propeller assembly preceding the arbitrary propeller assembly in the alternating series of propeller assemblies; and
   the forward propeller of the arbitrary propeller assembly being positioned offset from the rearward propeller of the adjacent propeller assembly by the corresponding separation distance.

5. The electric vacuum jet engine as claimed in claim 2 comprising:
   the motor for the at least one first propeller assembly being configured to conduct a first electrical polarity;
   the motor for the at least one second propeller assembly being configured to conduct a second electrical polarity; and
   the first electrical polarity and the second electrical polarity being opposite to each other.

6. The electric vacuum jet engine as claimed in claim 1 comprising:
   the corresponding annular bearing comprising a forward race and a rearward race;
   the forward race and the rearward race being rotatably connected to each other;
   the forward race and the rearward race being positioned opposite to each other along the corresponding separation distance;
   the adjacent propeller assembly succeeding the arbitrary propeller assembly in the alternating series of propeller assemblies;
   a rearward propeller of the arbitrary propeller assembly being torsionally connected to the forward race; and
   a forward propeller of the adjacent propeller assembly being torsionally connected to the rearward race.

7. The electric vacuum jet engine as claimed in claim 1 comprising:
   the corresponding annular bearing comprising a forward race and a rearward race;
   the forward race and the rearward race being rotatably connected to each other;
   the forward race and the rearward race being positioned opposite to each other along the corresponding separation distance;
   the adjacent propeller assembly preceding the arbitrary propeller assembly in the alternating series of propeller assemblies;
   a rearward propeller of the adjacent propeller assembly being torsionally connected to the forward race; and
   a forward propeller of the arbitrary propeller assembly being torsionally connected to the rearward race.

* * * * *